(12) United States Patent
Kim et al.

(10) Patent No.: US 8,997,925 B2
(45) Date of Patent: Apr. 7, 2015

(54) HIGH TEMPERATURE RESISTANT SOUND ABSORBING MATERIALS FOR VEHICLE

(71) Applicants: Hyundai Motor Company, Seoul (KR); Kia Motors Corporation, Seoul (KR); NVH Korea, Inc., Ulsan (KR)

(72) Inventors: Keun Young Kim, Gyeonggi-do (KR); Bong Hyun Park, Gyeonggi-do (KR); Won Jin Seo, Gyeonggi-do (KR); Youn Jin Cho, Gyeonggi-do (KR); Ki Dong Lee, Gyeonggi-do (KR); Su Nam Lee, Gyeonggi-do (KR)

(73) Assignees: Hyundai Motor Company, Seoul (KR); Kia Motors Corporation, Seoul (KR); NVH Korea, Inc., Ulsan (KR)

( * ) Notice: Subject to any disclaimer, the term of this patent is extended or adjusted under 35 U.S.C. 154(b) by 0 days.

(21) Appl. No.: 13/860,784

(22) Filed: Apr. 11, 2013

(65) Prior Publication Data

US 2014/0144723 A1    May 29, 2014

(30) Foreign Application Priority Data

Nov. 29, 2012    (KR) .................. 10-2012-0136980

(51) Int. Cl.
| | |
|---|---|
| *E04B 1/94* | (2006.01) |
| *E04B 1/84* | (2006.01) |
| *B32B 27/00* | (2006.01) |
| *E04B 1/92* | (2006.01) |
| *E04B 1/82* | (2006.01) |

(52) U.S. Cl.
CPC ..................................... *B32B 27/00* (2013.01)

(58) Field of Classification Search
USPC ........ 181/294, 284, 204; 296/39.3; 427/389.9
See application file for complete search history.

(56) References Cited

U.S. PATENT DOCUMENTS

| | | | | |
|---|---|---|---|---|
| 5,409,777 | A | * | 4/1995 | Kennedy et al. ........... 428/411.1 |
| 6,066,580 | A | * | 5/2000 | Yoshida et al. ............... 442/221 |
| 7,694,779 | B2 | * | 4/2010 | Takayasu et al. ............. 181/294 |
| 8,394,879 | B1 | * | 3/2013 | Bradshaw ..................... 524/414 |
| 8,607,928 | B2 | * | 12/2013 | Richardson et al. .......... 181/294 |
| 2007/0190876 | A1 | * | 8/2007 | Ogawa et al. ................. 442/136 |
| 2011/0174509 | A1 | * | 7/2011 | Quante et al. ................... 169/45 |
| 2012/0118589 | A1 | * | 5/2012 | Quante et al. ................... 169/43 |
| 2012/0321848 | A1 | * | 12/2012 | Richardson et al. .......... 428/138 |
| 2012/0321849 | A1 | * | 12/2012 | Richardson et al. .......... 428/138 |
| 2013/0341121 | A1 | * | 12/2013 | Kim et al. ..................... 181/294 |

FOREIGN PATENT DOCUMENTS

| | | |
|---|---|---|
| JP | 2001-055640 A | 2/2001 |
| JP | 2004299530 A | 10/2004 |

(Continued)

*Primary Examiner* — Edgardo San Martin
(74) *Attorney, Agent, or Firm* — Mintz Levin Cohn Ferris Glovsky and Popeo, P.C.; Peter F. Corless

(57) ABSTRACT

Disclosed is a highly heat resistant sound absorbing material for a vehicle capable of maintaining a shape even at high temperatures of about 200° C. or above and which satisfies UL 94V-0 flame retardancy. More particularly, the a highly heat resistant sound absorbing material includes a fiber material having a limiting oxygen index (LOI) of at least about 25% and capable of maintaining a shape at a temperature of about 200° C. or above, and a thermosetting binder resin capable of maintaining a shape at a temperature of about 200° C., wherein the fiber material and thermosetting binder resin are provided at a specific proportion.

10 Claims, 2 Drawing Sheets

(56) References Cited

FOREIGN PATENT DOCUMENTS

| | | | |
|---|---|---|---|
| JP | 4054826 B2 | 3/2008 | |
| JP | 2009-034869 A | 2/2009 | |
| KR | 10-0232377 | 9/1999 | |
| KR | 20-0349376 | 4/2004 | |
| KR | 10-2006-0013468 A | 2/2006 | |
| WO | WO 2013/191474 | * 12/2013 | ............. B62D 65/00 |

* cited by examiner

HIGH TEMPERATURE RESISTANT SOUND ABSORBING MATERIALS FOR VEHICLE

CROSS-REFERENCE TO RELATED APPLICATIONS

This application claims priority under 35 U.S.C. §119 to Korean Patent Application No. 10-2012-0136980, filed on Nov. 29, 2012, in the Korean Intellectual Property Office, the disclosure of which is incorporated herein by reference in its entirety.

BACKGROUND (a) Technical Field

The present invention relates to a highly heat resistant sound absorbing material for a vehicle. More particularly, the present invention relates to a highly heat resistant sound absorbing material for a vehicle including a fiber material having a limiting oxygen index (LOI) of at least 25% and which maintains its shape at a temperature of about 200° C. or above, and a thermosetting binder resin which maintains its shape at a temperature of about 200° C. or above The fiber material and thermosetting binder resin are provided at a specific proportion to form a sound absorbing material that maintains its shape even at high temperatures of about 200° C. or above and that satisfies UL 94V-0 flame retardancy.

(b) Background Art

Various kinds of noise are generated during operation of a vehicle. The vehicle noise mainly emanates from an engine or an exhaust system and is transmitted into the passenger compartment of the vehicle via air. A sound absorbing material has been used to reduce the noise emanating from the engine and the exhaust system and transmitted into the passenger compartment. An insulation dash, a dash isolation pad, etc., are used to prevent noise from the engine from being transmitted into the passenger compartment. Further, a tunnel pad, a floor carpet, etc., are used to prevent noise from the exhaust system from being transmitted into the passenger compartment.

As a sound absorbing material for a vehicle, Korean Patent Application Publication No. 2004-0013840 describes insertion of a synthetic resin film layer that is 40-100 μm thick in a length direction into a 20-mm thick PET fiber layer. Korean Patent Application Publication No. 2002-0089277 describes preparation of a sound absorbing insulation in the form of a nonwoven fabric by cutting and beating out a polyester fiber and an acrylic fiber, mixing with a low-melting-point polyester fiber, and heating. Korean Patent Application Publication No. 2006-0043576 describes a method of coating at least one of an upper layer and a lower layer of a polyester (PET) felt using a fiber mixture of a low-melting-point fiber (LMF) and a regular fiber.

However, the presently known sound absorbing materials for vehicles are limited in that their weight needs to be increased in order to reduce noise from the engine and the exhaust system. Further, the resulting noise reduction is unsatisfactory considering the increased weight. To overcome this limitation, it is necessary to apply the sound absorbing material as close to the source of noise from the engine and the exhaust system as possible. However, for such application of the sound absorbing material close to the source of noise from the engine and the exhaust system, the sound absorbing material must be capable of maintaining its shape even at high temperatures of about 200° C. or above, and must further possess superior flame retardancy.

SUMMARY

The present invention provides a highly heat resistant sound absorbing material for a vehicle that maintains its shape even at high temperatures of about 200° C. or above. The sound absorbing material is, thus, capable of application at locations closest to the source of noise from the engine and the exhaust system of a vehicle. The sound absorbing material further satisfies UL 94V-0 flame retardancy.

The present invention further provides a highly heat resistant sound absorbing material for a vehicle capable of insulating heat and protecting nearby plastic and rubber parts that are applied to a metal part of about 200° C. or above.

In an aspect, the present invention provides a highly heat resistant sound absorbing material for a vehicle that maintains a shape even at high temperatures of about 200° C. or above and that satisfies UL 94V-0 flame retardancy.

In an exemplary embodiment of the present invention, the highly heat resistant sound absorbing material for a vehicle includes about 20-80 parts by weight of a fiber material having a limiting oxygen index (LOI) of at least about 25% and which maintains its shape at a temperature of about 200° C. or above, and about 20-80 parts by weight of a thermosetting binder resin which maintains its shape at a temperature of about 200° C. or above, wherein the parts by weight are based on the total weight of the sound absorbing material.

In an exemplary embodiment of the present invention, the fiber material includes one or more materials selected from the group consisting of m-aramid fiber, p-aramid fiber, polyphenylene sulfide (PPS) fiber, preoxidized polyacrylonitrile (PAN) fiber, polyimide (PI) fiber, polybenzimidazole (PBI) fiber, polybenzoxazole (PBO) fiber, polytetrafluoroethylene (PTFE) fiber, metallic fiber, carbon fiber, glass fiber, basalt fiber, silica fiber and ceramic fiber.

In an exemplary embodiment of the present invention, the thermosetting binder resin includes a binder dispersed in an organic solvent. The binder includes about 100 wt % of an epoxy resin, 1-20 wt % of a curing agent and 1-10 wt % of a catalyst, wherein the wt % are based on the total weight of epoxy resin. The binder may be dispersed in the organic solvent at a concentration of about 5-70 wt % of binder based on the total amount of binder and organic solvent.

In an exemplary embodiment of the present invention, a flame retardant is further included in the organic solvent addition to the binder. In particular, about 10-40 wt % flame retardant and about 60-90 wt % binder (wherein the wt % are based on the total weight of the flame retardant and binder) can be dispersed in the organic solvent. In an exemplary embodiment of the present invention, the epoxy resin includes one or more selected from the group consisting of bisphenol A diglycidyl ether, bisphenol F diglycidyl ether, polyoxypropylene diglycidyl ether, phosphazene diglycidyl ether, phenol novolac epoxy, o-cresol novolac epoxy and bisphenol A novolac epoxy.

In an exemplary embodiment of the present invention, the organic solvent includes one or more selected from the group consisting of methyl ethyl ketone (MEK) and dimethyl carbonate (DMC).

Other features and aspects of the present invention will be apparent from the following detailed description, drawings and claims.

BRIEF DESCRIPTION OF THE DRAWINGS

The above and other objects, features and advantages of the present invention will now be described in detail with refer

DETAILED DESCRIPTION OF MAIN ELEMENTS

Figure 1:
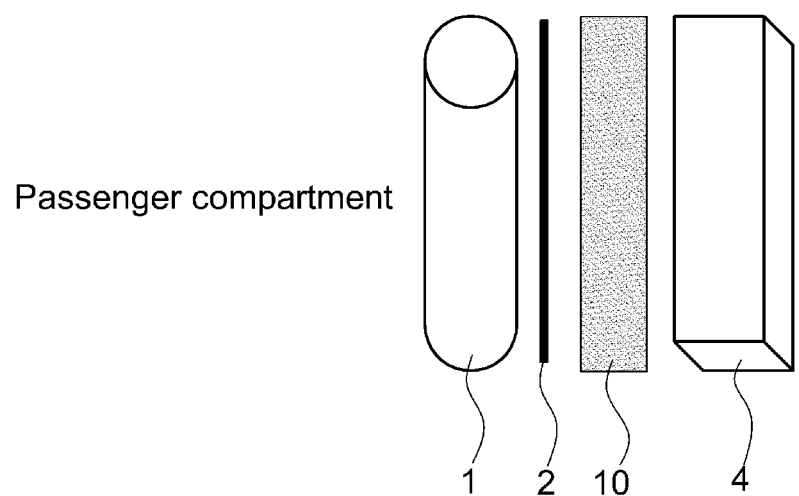
- FIG. 1 shows a highly heat resistant sound absorbing material for a vehicle for reducing noise emanating from the engine according to an embodiment of the present invention.
Figure 2:
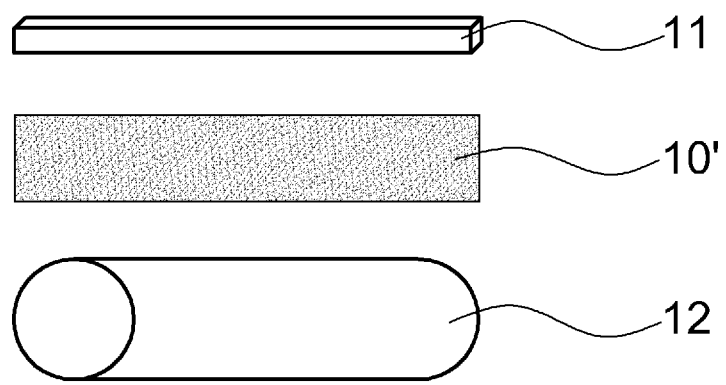
FIG. 2 shows a highly heat resistant sound absorbing material for a vehicle for reducing noise emanating from the exhaust system according to another embodiment of the present invention.

1: diesel particulate filter (DPF)
2: DPF heat shield
4: engine cylinder block
10, 10': highly heat resistant sound absorbing material for a vehicle
11: floor panel
12: muffler It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, reference will now be made in detail to various embodiments of the present invention, examples of which are illustrated in the accompanying drawings and described below. While the invention will be described in conjunction with exemplary embodiments, it will be understood that the present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about".

A highly heat resistant sound absorbing material for a vehicle according to the present invention maintains its shape even at high temperatures of about 200° C. or above and further satisfies UL 94V-0 flame retardancy.

According to an embodiment, the highly heat resistant sound absorbing material for a vehicle includes about 20-80 parts by weight of a fiber material and about 20-80 parts by weight of a thermosetting binder resin, wherein the parts by weight are based on the total weight of the sound absorbing material. In particular the fiber material is a material having a limiting oxygen index (LOI) of at least about 25% and which maintains its shape at a temperature of about 200° C. or above, and the thermosetting binder resin is a material that maintains its shape at a temperature of about 200° C. or above.

The fiber material includes one or more materials selected from the group consisting of m-aramid fiber, p-aramid fiber, polyphenylene sulfide (PPS) fiber, preoxidized polyacrylonitrile (PAN) fiber, polyimide (PI) fiber, polybenzimidazole (PBI) fiber, polybenzoxazole (PBO) fiber, polytetrafluoroethylene (PTFE) fiber, metallic fiber, carbon fiber, glass fiber, basalt fiber, silica fiber and ceramic fiber. The fiber material serves as a base material of the highly heat resistant sound absorbing material and reduces noise transmitted to the passenger compartment of the vehicle by absorbing the noise emanating from the engine and the exhaust system.

The thermosetting binder resin includes a binder including about 100 wt % of an epoxy resin, about 1-20 wt % of a curing agent and about 1-10 wt % of a catalyst, based on the weight of epoxy resin. The binder is dispersed in an organic solvent at a concentration of about 5-70 wt % binder based on the total amount of binder and organic solvent. The thermosetting binder resin binds the fiber material of the highly heat resistant sound absorbing material, thereby aiding in maintaining the shape of the highly heat resistant sound absorbing material.

The thermosetting binder resin may further include a flame retardant in addition to the binder. According to an exemplary embodiment, the thermosetting binder resin includes about 10-40 wt % flame retardant based on the total weight of the thermosetting binder resin.

According to an embodiment of the present invention, the epoxy resin includes one or more selected from the group consisting of bisphenol A diglycidyl ether, bisphenol F diglycidyl ether, polyoxypropylene diglycidyl ether, phosphazene diglycidyl ether, phenol novolac epoxy, o-cresol novolac epoxy and bisphenol A novolac epoxy.

According to an embodiment of the present invention, the organic solvent includes one or more selected from the group consisting of methyl ethyl ketone (MEK) and dimethyl carbonate (DMC). The organic solvent may serves to uniformly disperse the thermosetting binder resin such that the thermosetting binder resin may penetrate into the fiber material at a predetermined concentration.

EXAMPLES

The present invention will be described in more detail through examples. The following examples are for illustrative purposes only and it will be apparent to those skilled in the art not that the scope of this invention is not limited by the examples.

Example 1

50 parts by weight of m-aramid fiber and 50 parts by weight of preoxidized polyacrylonitrile (PAN) fiber were carded into a web, laminated to a surface density of 300 g/m², and needle-punched to prepare a 6-mm thick nonwoven fabric.

Example 2 m-Aramid fiber was beaten out, carded into a web, laminated to a surface density of 300 g/m², and needle-punched to prepare a 4-mm thick nonwoven fabric.

Example 3

100 wt % of an epoxy resin including bisphenol A diglycidyl ether, polyoxypropylene diglycidyl ether and phosphazene diglycidyl ether at a weight ratio of 45:40:15 was mixed with 10 wt % of a cyanoguanidine curing agent, 8 wt % of a bisdimethylurea catalyst and 30 wt % of a melamine cyanurate flame retardant to prepare a thermosetting binder resin.

Example 4

A thermosetting binder resin was prepared in the same manner as in Example 3, with the exception that 30 wt % of the melamine cyanurate flame retardant was excluded.

Example 5

The thermosetting binder resin prepared in Example 3 was dispersed in a dimethyl carbonate (DMC) organic solvent to a concentration of 15%, and the 300 g/m² nonwoven fabric prepared in Example 1 was immersed therein to a surface density of 1,000 g/m². Then, 850 g/m² of the organic solvent was removed, so that 150 g/m² of the thermosetting binder resin remained. As a result, 450 g/m² of a binder-impregnated nonwoven fabric was prepared.

Example 6

The thermosetting binder resin prepared in Example 4 was dispersed in a dimethyl carbonate (DMC) organic solvent to a concentration of 30%, and 100 g/m² was gravure-treated on one side of the binder-impregnated nonwoven fabric prepared in Example 5. Then, 70 g/m² of the organic solvent was removed, so that 30 g/m² of the thermosetting binder resin remained. As a result, 480 g/m² of a gravure-treated nonwoven fabric was prepared.

Example 7

The thermosetting binder resin prepared in Example 3 was dispersed in a dimethyl carbonate (DMC) organic solvent to a concentration of 25% and the 300 g/m² nonwoven fabric prepared in Example 2 was immersed therein to a surface density of 1,200 g/m². Then, 900 g/m² of the organic solvent was removed, so that 300 g/m² of the thermosetting binder resin remained. As a result, 600 g/m² of a binder-impregnated nonwoven fabric was prepared.

Example 8

480 g/m² of the gravure-treated nonwoven fabric prepared in Example 6 was laminated on the binder-impregnated surface of 450 g/m² of the binder-impregnated nonwoven fabric prepared in Example 5. Then, a highly heat resistant sound absorbing material for a vehicle was prepared by heat-pressing at 200° C. for 200 seconds with a pressure of 100 kgf/cm² to a thickness of 2-10 mm.

Example 9

A highly heat resistant sound absorbing material for a vehicle was prepared by heat-pressing 600 g/m² of the binder-impregnated nonwoven fabric prepared in Example 7 at 200° C. for 200 seconds with a pressure of 100 kgf/cm² to a thickness of 3 mm.

Sound absorption coefficients of the highly heat resistant sound absorbing materials for a vehicle prepared in Example 8 and Example 9 were measured according to ISO R 354, alpha cabin method. The average of sound absorption coefficients measured for three specimens is shown in Table 1 and Table 2. Considering the use environment of the highly heat resistant sound absorbing material for a vehicle, tests were carried out with an air gap of 80 mm.

TABLE 1

| Frequency (Hz) | 1,000 | 2,000 | 3,150 | 5,000 |
|---|---|---|---|---|
| Thickness (mm) | Sound Absorption Coefficients | | | |
| 2 | 0.68 | 0.71 | 0.77 | 0.86 |
| 3 | 0.73 | 0.77 | 0.86 | 0.99 |
| 4 | 0.73 | 0.78 | 0.93 | 1.06 |
| 5 | 0.73 | 0.81 | 0.99 | 1.12 |
| 6 | 0.75 | 0.82 | 1.07 | 1.17 |
| 7 | 0.78 | 0.85 | 1.12 | 1.22 |
| 8 | 0.80 | 0.89 | 1.13 | 1.28 |
| 9 | 0.81 | 0.91 | 1.13 | 1.25 |
| 10 | 0.83 | 0.91 | 1.16 | 1.26 |

As seen from Table 1, the highly heat resistant sound absorbing material for a vehicle according to the present invention exhibits excellent effect of improving noise in the passenger compartment of a vehicle by reducing the noise emanating from the engine when applied at a location close to the source of engine noise. The sound absorption coefficient greater than 1 is a result of decreased reverberation time because the noise reflected from the alpha cabin was further absorbed by the back side of the highly heat resistant sound absorbing material for a vehicle.

TABLE 2

| Frequency (Hz) | 1,000 | 2,000 | 3,150 | 5,000 |
|---|---|---|---|---|
| Thickness (mm) | Sound Absorption Coefficients | | | |
| 3 | 0.40 | 0.54 | 0.63 | 0.82 |

As seen from Table 2, the highly heat resistant sound absorbing material for a vehicle according to the present invention exhibits excellent effect of improving noise in the passenger compartment of a vehicle by reducing the noise emanating from the exhaust system when applied at a location close to the source of exhaust system noise.

Example 10

A highly heat resistant sound absorbing material for a vehicle was prepared in the same manner as in Example 8, using a mold for an engine cylinder block.

Comparative Example 1

A sound absorbing material for a vehicle was prepared using 950 g/m² of a glass wool material, which is presently used as a sound absorbing material for a vehicle, and a mold for an engine cylinder block.

The highly heat resistant sound absorbing material for a vehicle prepared in Example 10 and the sound absorbing material for a vehicle prepared in Comparative Example 1 were aged at 250° C. for 200 hours using a heat insulation chamber. As results, the highly heat resistant sound absorbing material for a vehicle according to the present invention maintained its shape and, thus, could maintain its function when applied at a location close to the source of engine noise. On the other hand, the sound absorbing material currently used in the engine room of a vehicle did not maintain its shape and, thus, would not be capable of maintaining its function.

Example 11

A highly heat resistant sound absorbing material for a vehicle was prepared in the same manner as in Example 9, using a mold for a heat protector.

Comparative Example 2

A heat protector was prepared using a 1-mm thick aluminum material, which is presently used to block heat produced from the exhaust system, and a mold for a heat protector.

Temperature of the highly heat resistant sound absorbing material for a vehicle prepared in Example 11 and the aluminum heat protector prepared in Comparative Example 2 was measured while applying heat to a heat shield with the temperature of the heat source maintained at 250° C., at the opposite side. The results are given in Table 3.

TABLE 4

| Time (sec) | | 0 | 100 | 200 | 300 | 400 | 500 | 600 |
|---|---|---|---|---|---|---|---|---|
| Example 10 | ° C. | 25 | 98 | 107 | 112 | 113 | 114 | 115 |
| Comparative Example 2 | | 30 | 110 | 122 | 124 | 125 | 126 | 127 |

As seen from Table 3, the highly heat resistant sound absorbing material for a vehicle according to the present invention could not only improve the noise in the passenger compartment of a vehicle but also protect nearby plastic and rubber parts by blocking heat, when used in place of the aluminum heat protector.

The highly heat resistant sound absorbing material for a vehicle according to the present invention exhibits an excellent effect of improving noise in the passenger compartment of a vehicle by reducing the noise emanating from the engine and the exhaust system when applied at a location close to the source of noise.

Further, the present sound absorbing material exhibits an excellent effect of protecting nearby plastic and rubber parts when applied to a metal part of about 200° C. or above by blocking heat.

The present invention has been described in detail with reference to specific embodiments thereof. However, it will be appreciated by those skilled in the art that various changes and modifications may be made in these embodiments without departing from the principles and spirit of the invention, the scope of which is defined in the appended claims and their equivalents.

What is claimed is:

1. A highly heat resistant sound absorbing material for a vehicle that maintains a shape at temperatures of about 200° C. or above and satisfies UL 94V-0 flame retardancy,
   wherein the highly heat resistant sound absorbing material for a vehicle comprises about 20-80 parts by weight of a fiber material and about 20-80 parts by weight of a thermosetting binder resin,
   wherein the fiber material is impregnated with the thermosetting binder resin, as being uniformly dispersed and penetrated into the fiber material at a predetermined concentration, and the thermosetting binder resin maintains the shape of the highly heat resistant sound absorbing material.

2. The highly heat resistant sound absorbing material for a vehicle according to claim 1, wherein the fiber material has a limiting oxygen index (LOI) of at least about 25% and maintains a shape at a temperature of about 200° C. or above, and the thermosetting binder resin maintains a shape at a temperature of about 200° C. or above.

3. The highly heat resistant sound absorbing material for a vehicle according to claim 1, wherein the fiber material comprises one or more selected from the group consisting of m-aramid fiber, p-aramid fiber, polyphenylene sulfide (PPS) fiber, preoxidized polyacrylonitrile (PAN) fiber, polyimide (PI) fiber, polybenzimidazole (PBI) fiber, polybenzoxazole (PBO) fiber, polytetrafluoroethylene (PTFE) fiber, metallic fiber, carbon fiber, glass fiber, basalt fiber, silica fiber and ceramic fiber.

4. The highly heat resistant sound absorbing material for a vehicle according to claim 1, wherein the thermosetting binder resin comprises a binder comprising about 100 wt % of an epoxy resin, about 1-20 wt % of a curing agent based on the weight of the epoxy resin and about 1-10 wt % of a catalyst based on the weight of the epoxy resin.

5. The highly heat resistant sound absorbing material for a vehicle according to claim 4, wherein the thermosetting binder resin further comprises, in addition to the binder, 10-40 wt % of a flame retardant, wherein the wt % is based on the total weight of the thermosetting binder resin.

6. The highly heat resistant sound absorbing material for a vehicle according to claim 4, wherein the thermosetting binder resin comprises the binder dispersed in an organic solvent at a concentration of about 5-70 wt % based on the total amount of binder and organic solvent.

7. The highly heat resistant sound absorbing material for a vehicle according to claim 5, wherein the thermosetting binder resin comprises the binder dispersed in an organic solvent at a concentration of 5-70 wt %.

8. The highly heat resistant sound absorbing material for a vehicle according to claim 4, wherein the epoxy resin comprises one or more selected from a group consisting of bisphenol A diglycidyl ether, bisphenol F diglycidyl ether, polyoxypropylene diglycidyl ether, phosphazene diglycidyl ether, phenol novolac epoxy, o-cresol novolac epoxy and bisphenol A novolac epoxy.

9. The highly heat resistant sound absorbing material for a vehicle according to claim 5, wherein the epoxy resin comprises one or more selected from a group consisting of bisphenol A diglycidyl ether, bisphenol F diglycidyl ether, polyoxypropylene diglycidyl ether, phosphazene diglycidyl ether, phenol novolac epoxy, o-cresol novolac epoxy and bisphenol A novolac epoxy.

10. The highly heat resistant sound absorbing material for a vehicle according to claim 6, wherein the organic solvent comprises one or more selected from the group consisting of methyl ethyl ketone (MEK) and dimethyl carbonate (DMC).

* * * * *